United States Patent [19]

Beecken

[11]  4,422,969
[45]  Dec. 27, 1983

[54] CATIONIC STYRYL DYESTUFFS

[75] Inventor: Hermann Beecken, Bergisch-Gladbach, Fed. Rep. of Germany

[73] Assignee: Bayer Aktiengesellschaft, Leverkusen, Fed. Rep. of Germany

[21] Appl. No.: 313,111

[22] Filed: Oct. 20, 1981

[30] Foreign Application Priority Data

Oct. 30, 1980 [DE] Fed. Rep. of Germany ....... 3040911

[51] Int. Cl.$^3$ .................. C07D 213/57; C07C 121/78
[52] U.S. Cl. ..................................... 260/152; 260/154; 260/155; 260/156; 260/157; 260/165; 260/465 D; 542/421; 8/586
[58] Field of Search ................... 260/465 D, 152, 154, 260/155, 156, 157, 165; 542/421

[56] References Cited

U.S. PATENT DOCUMENTS

3,257,394 6/1966 Cohen ............................... 542/421

FOREIGN PATENT DOCUMENTS

1372691 8/1964 France .
2026522 2/1980 United Kingdom .

*Primary Examiner*—Henry R. Jiles
*Assistant Examiner*—Bernard Dentz
*Attorney, Agent, or Firm*—Sprung, Horn, Kramer & Woods

[57] ABSTRACT

Cationic styryl dyestuffs of the general formula $$\left[ Q^+ - X - \underset{R}{N} - A - CH = \underset{CN}{C} - CO - \underset{R^1}{N} - \right]_2 B \; 2 \; An^-,$$

wherein
  $Q^+$ designates a cationic grouping,
  X designates a connecting member, and
  R designates hydrogen, alkyl, alkenyl, aralkyl, aryl, a radical of the formula $-X-Q^+An^-$ or, by ring closure with $-X-Q^+$ and the N atom, form a heterocyclic structure of the formula $$\underset{R^3}{\overset{R^2}{\diagdown}} {}^+N \underset{\diagup}{\diagup} N-,$$

where
  $R^2$ is identical to hydrogen, alkyl, alkenyl or aralkyl, and
  $R^3$ is identical to alkyl, or
  $R^2$ and $R^3$ together are identical to $(CH_2)_4$ or $(CH_2)_5$, and
  A designates a 1,4-arylene group, which optionally gives a fused ring system by ring closure with N-R,
  $R^1$ designates hydrogen or alkyl,
  B designates a divalent, non-ionic aromatic and/or hetero-aromatic bridge, and
  An$^-$ designates an anion, and the cyclic and acyclic substituents, connecting members and bridges can carry non-ionic radicals, are used for dyeing natural and synthetic cationically colorable substrates, preferably for dyeing paper.

4 Claims, No Drawings

CATIONIC STYRYL DYESTUFFS

The present invention relates to dyestuffs of the general formula

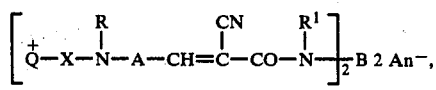

wherein
$Q^+$ designates a cationic grouping,
X designates a connecting member, and
R designates hydrogen, alkyl, alkenyl, aralkyl, aryl, a radical of the formula $-X-Q^+AN^-$ or, by ring closure with $-X-Q^+$ and the N atom, form a heterocyclic structure of the formula

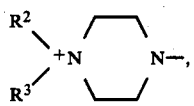

where
$R^2$ is identical to H, alkyl, alkenyl or aralkyl, and
$R^3$ is identical to alkyl, or
$R^2$ and $R^3$ together are identical to $(CH_2)_4$ or $(CH_2)_5$, and
A designates a 1,4-arylene group, which optionally gives a fused ring system by ring closure with N-R,
$R^1$ designates hydrogen or akyl,
B designates a divalent, non-ionic aromatic and/or hetero-aromatic bridge, and
$An^-$ designates an anion,
and the cyclic and acyclic substituents, connecting members and bridges can carry non-ionic radicals, and their preparation and use for dyeing natural and synthetic cationically colorable substrates and bulk materials, preferably for dyeing, writing on, and printing cellulose-containing materials, particularly paper in pulp form and as a surface.

The following groups, which are customary with externally cationic dyestuffs, are considered as cationic groupings $Q^+$: ammonium, cycloammonium, hydrazinium, etherified hydroxylammonium, sulphonium and isothiuronium, hydrogen and alkyl being preferably used as substituents at N, S and O, in addition to alkenyl, aralkyl, aryl and $C_5$- to $C_6$-cycloalkyl.

Suitable connecting members X are optionally branched chains $C_nH_{2n}$, $C_nH_{2n}-O-C_mH_{2m}$, $C_nH_{2n}OCOC_mH_{2m}$ and $C_nH_{2n}OCOCH_2$, wherein n and m, independently of one another, can take the numerical values 2 to 4, and which are optionally substituted by 1 to 2Cl, hydroxyl, $C_1$- to $C_4$-alkyloxy or phenyl.

Alkyl particularly designates a $C_1$- to $C_4$-alkyl radical, alkenyl particularly designates a $C_3$- to $C_5$-alkenyl radical and aralkyl particularly designates an aryl-$C_1$- to -$C_3$-alkyl radical, and the optionally branched alk(en)yl radicals can additionally be substituted by halogen (fluorine, bromine or preferably chlorine), cyano, hydroxyl, amino, formylamino, $C_1$- to $C_3$-alkylcarbonylamino, phenylcarbonylamino, $C_1$- to $C_4$-alkoxy, $C_1$- to $C_4$-alkyloxycarbonyl, $C_1$- to $C_3$-alkylcarbonyloxy, aryloxy or aryl-$C_1$- to -$C_3$-alkyloxy.

Aryl preferably designates phenyl, which optionally carries, as non-ionic substituents, $C_1$- to $C_4$-alkyl, $C_1$- to $C_4$-alkyloxy, cyano, $C_1$- to $C_4$-alkylcarbonyl, $C_1$- to $C_4$-alkylcarbonyloxy, $C_1$- to $C_4$-alkyloxycarbonyl, $C_1$- to $C_3$-alkylcarbonylamino, halogen (fluorine, bromine or preferably chlorine) or trifluoromethyl.

A 1,4-arylene group is understood as meaning, in addition to 1,4-naphthylene, preferably 1,4-phenylene, which optionally contains 1 to 2 substituents from the series comprising $C_1$- to $C_2$-alkyl, $C_1$- to $C_2$-alkoxy, halogen (fluorine, bromine or preferably chlorine), $C_1$- to $C_2$-alkyloxycarbonyl, $C_1$- to $C_2$-alkylcarbonyloxy, $C_1$- to $C_2$-alkylcarbonylamino, cyano, $CF_3$ or nitro.

The fused ring systems, resulting from a ring closure of the 1,4-arylene group with the radical R via the common N atom, preferably are 2,3-dihydroindole, 1,2,3,4-tetrahydroquinoline or 2,3-dihydrobenz-[b]-1,4-oxazine systems, which are optionally substituted by 1 to 4 $C_1$- to $C_4$-alkyl and/or 1 to 2 $C_1$- to $C_4$-alkoxy, phenyl, F or Cl.

The following systems, which are directly bonded, or bonded via methylene groups, to the two N atoms, are preferred suitable divalent non-ionic bridges B, within the scope of the invention:

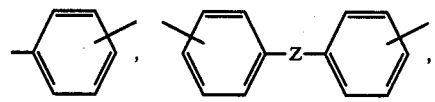

wherein
Z designates a direct bond or a connecting member from the series comprising O, S, $NR^4$, CO, COO, OCO, $CR^4R^5$, $(CH_2)_2$, $CH=CH$, $CH_2O$, $CH_2OCH_2$, $SO_2$, $SO_2O$, $N=N$, $NR^4CO$, $NR^4-CO-NR^5$, $NR^4-CO-CO-NR^5$, $NR^4-CO-(CH_2)_{1-4}-CO-NR^5$,

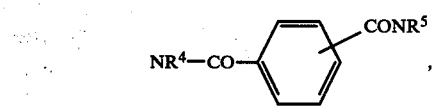

$CO-NR^4-CO$, $CONHNHCO$,

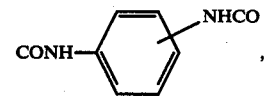

$NR^4SO_2$ or $NR^4SO_2NR^5$ (wherein $R^4$ and $R^5$, independently of one another, represent $C_1$- to $C_4$-alkyl, and in the case of $CR^4R^5$, also together represent $(CH_2)_4$ or $(CH_2)_5$, but particularly represent hydrogen),

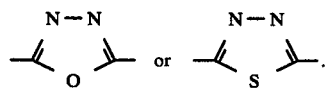

The bridges B can also be naphthylene and other multinuclear systems, such as, for example,

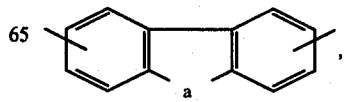

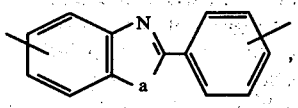

with a being O, S or NR⁵, and

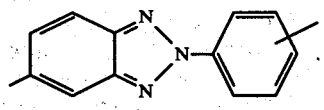

The aromatic radicals mentioned can be non-ionically substituted, especially by $C_1$- to $C_4$-alkyl, $C_1$- to $C_4$-alkyloxy, $CF_3$, CN, F, Cl and Br. The aromatic nuclei which function as the bridges B or as bridge members are preferably 1,3- or 1,4-arylenes.

The inorganic and organic anions which are customary for cationic dyestuffs are suitable anionic radicals $An^-$ (see, for example, DE-OS (German Published Specification) No. 2,128,326, pages 5 to 7, and DE-OS (German Published Specification) No. 2,520,816, pages 4 to 6). Colourless anions are preferred, which impart to the particular dyestuff the solubility properties desired for the intended dyeing process.

The anion is determined, in the main, by the preparation process and the purification, which may be undertaken, of the cationic compound. In general, the dyestuffs are present as halides, particularly chlorides or bromides, or as methosulphates, ethosulphates, sulphates, nitrates, chlorozincates, benzenesulphonates, toluenesulphonates, naphthalenesulphonates, acetates, propionates, glycolates, lactates, arylates or formates. These anions can be exchanged, in a known manner, for other anions. For this purpose, the possibility of precipitation of the dyestuff cations with colourless anions which impart poor solubility, or with dyestuff anions, can also be included.

Dyestuffs of the formula

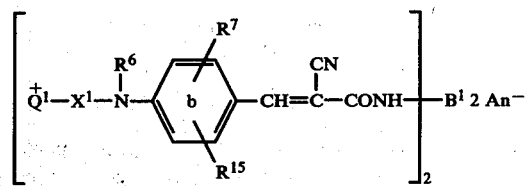

are preferred, wherein $Q^{+1}$ represents

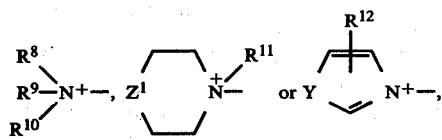

and wherein $R^8$, $R^9$, $R^{10}$ and $R^{11}$, independently of one another, represent hydrogen or $C_1$- to $C_4$-alkyl, which can be substituted by hydroxyl, amino, formylamino, $C_1$- to $C_4$-alkoxy, hydroxy-$C_2$- to $C_4$-alkoxy, phenyl, phenyloxy, $C_1$- to $C_3$-alkylcarbonyloxy, fluorine, chlorine or bromine, and $R^8$ additionally represents $C_1$- to $C_4$-alkoxy, amino, formylamino, phenyl, cyclopentyl or cyclohexyl, $Z^1$ represents a direct bond, $CH_2$, $C_2H_4$, O, S, NH or N-$C_1$- to $C_2$-alkyl, $R^{12}$ represents 1 to 3 radicals from the series comprising hydrogen, $C_1$- to $C_4$-alkyl, fluorine, chlorine or bromine, Y represents O, S, NH, N-$C_1$- to $C_2$-alkyl or CH=CH, $X^1$ represents $C_2$- to $C_3$-alkylene, which is optionally branched and/or substituted by hydroxyl, $C_1$- to $C_4$-alkoxy or phenyl, and $R^6$ represents $C_1$- to $C_4$-alkyl, which is optionally substituted by chlorine, cyano, $C_1$- to $C_4$-alkyloxy, phenyl or phenyloxy, or $R^6$ represents phenyl or the radical $-X-Q^{+1}An^-$, or $R^6$ with $-X-Q^{+1}$ and the N atom, to which both are bonded, together form a piperazinium system of the structure

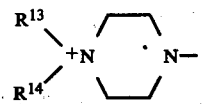

$R^{13}$ represents hydrogen or $C_1$- to $C_4$-alkyl, which can be substituted by $C_1$- to $C_4$-alkyloxy, hydroxyl, $C_1$- to $C_3$-alkylcarbonyloxy or phenyl, $R^{14}$ represents $C_1$- to $C_4$-alkyl, or $R^{13}$ and $R^{14}$ together represent $(CH_2)_4$ or $(CH_2)_5$, or $R^6$ and $R^7$, together with the benzene ring and the nitrogen atom to which $R^6$ is bonded, are constituents of an indoline, 1,2,3,4-tetrahydroquinoline or 2,3-dihydro-1,4-benzoxazine ring system, which is optionally substituted in the heterocyclic ring by 1 to 4 $C_1$- to $C_4$-alkyl groups or by a phenyl radical, or $R^7$ and $R^{15}$, independently of one another, denote hydrogen, $C_1$- to $C_2$-alkyl, $C_1$- to $C_2$-alkyloxy, bromine or chlorine, and $B^1$ represents

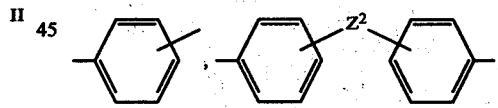

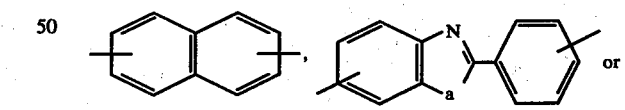

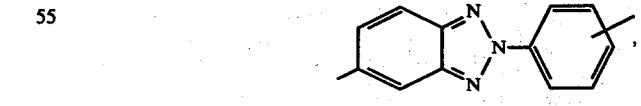

wherein $Z^2$ designates a direct bond or a connecting member from the series of O, S,

$(CH_2)_2$, $CH=CH$, $CH_2O$, $CH_2OCH_2$, $NR^{16}$, $N=N$, $NR^{16}CO$, $NR^{16}CONR^{16}$, $NR^{16}CO(CH_2)_{1-4}CONR^{16}$, $CONR^{16}CO$, $NR^{16}SO_2$,

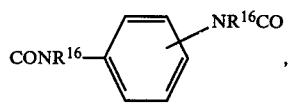

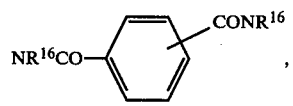

CO—NH—NH—CO and

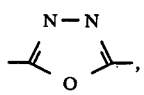

and $R^{16}$ and $R^{16a}$, independently of one another, represent $C_1$- to $C_2$-alkyl and, particularly, hydrogen, and in the case of

also together represent $(CH_2)_4$ or $(CH_2)_5$, a represents O, S or $NR^{16}$ and An⁻ represents an anion,
wherein phenylene nuclei are preferably present as 1,3- or 1,4-phenylene, and the phenyl radicals and phenylene, naphthylene and fused benzoid nuclei mentioned can additionally be substituted by 1 to 3 $C_1$- to $C_4$-alkyl groups, $C_1$- to $C_4$-alkyloxy groups, $C_1$- to $C_4$-alkyloxycarbonyl groups, cyano groups or $CF_3$ groups and/or Br or Cl.

Of particular industrial interest are the dyestuffs of the general formula

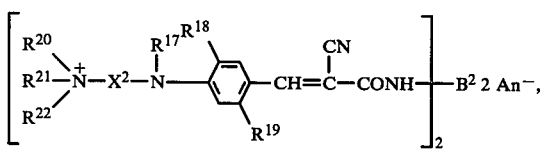

III wherein

An⁻ has the meaning mentioned, $R^{20}$, $R^{21}$ and $R^{22}$, independently of one another, represent hydrogen or $C_1$- to $C_4$-alkyl, which can be substituted by hydroxyl, amino, formylamino, $C_1$- to $C_4$-alkoxy, hydroxy-$C_2$- to $C_4$-alkoxy, phenyl, phenoxy, $C_1$- to $C_3$-alkylcarbonyloxy or chlorine, and $R^{20}$ additionally represents phenyl or cyclohexyl, or $R^{20}$, $R^{21}$ and $R^{22}$ together with the quaternary nitrogen represent pyridinium which is optionally substituted by methyl or ethyl, $X^2$ represents optionally branched $C_2$- to $C_3$-alkylene, $R^{17}$ represents $C_1$- to $C_4$-alkyl, which is optionally substituted by cyano, $C_1$- to $C_4$-alkyloxy, phenyl or phenyloxy, $R^{18}$ and $R^{19}$, independently of one another, represent hydrogen, $C_1$- to $C_2$-alkyl, $C_1$- to $C_2$-alkyloxy or chlorine, or $R^{17}$ and $R^{18}$ together represent the ring members necessary for the formation of a dihydroindole, 1,2,3,4-tetrahydroquinoline or 2,3-dihydrobenz-[b]-1,4-oxazine system, particularly the members $CH_2CH(CH_3)$, $C(CH_3)_2CH(CH_3)$, $CH_2CH_2CH(CH_3)$, $CH(CH_3)CH_2C(CH_3)_2$, $OCH_2CH_2$, $OCH_2CH(CH_3)$, $OCH_2CH(C_6H_5)$ or $OC(CH_3)_2CH(CH_3)$, and $B^2$ denotes

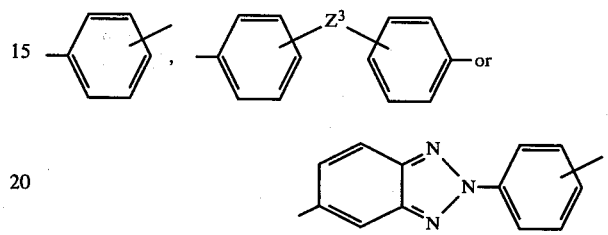

wherein the phenylene radicals are 1,3- or 1,4-linked and can carry, in addition, 1 to 2 radicals from the series comprising $CH_3$, $C_2H_5$, $CH_3O$, $C_2H_5O$ or Cl, and $Z^3$ designates a direct bond or the bridge members $(CH_2)_2$, $CH=CH$,

(with $R^{23}$ and $R^{24}$, independently of one another, identical with H, $CH_3$ or $C_2H_5$ or, together, $(CH_2)_5$), $NR^{25}$ (with $R^{25}$ equal to H, $CH_3$ or $C_2H_5$), NHCO, NHCONH, CONHCO or

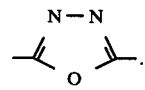

Particularly valuable dyestuffs within the scope of the invention correspond to the formula

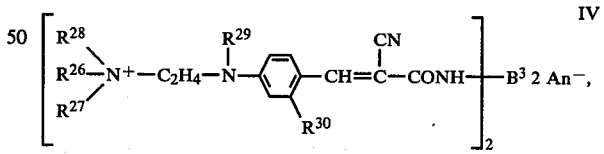

IV wherein

An⁻ has the meaning mentioned, and $R^{28}$, $R^{26}$ and $R^{27}$, independently of one another, are identical with H, methyl, ethyl, propyl, butyl, hydroxyethyl, hydroxypropyl, formylaminoethyl, formylaminopropyl, aminoethyl or aminopropyl, or $R^{28}$, $R^{26}$ and $R^{27}$ together with the quaternary nitrogen represent pyridinium, which is optionally substituted by methyl or ethyl, $R^{29}$ denotes methyl, ethyl, methoxyethyl, ethoxyethyl, cyanoethyl, phenyl, benzyl, α- or β-phenylethyl, phenyloxyethyl or phenyloxypropyl, $R^{30}$ denotes hydrogen or methyl, and $B^3$ denotes 1,3- or 1,4-phenylene, or a radical of the formula

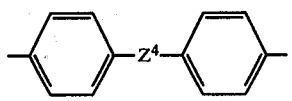

wherein
the phenylene radicals can be substituted by 1 to 2 methyl, chlorine or methoxy, and
$Z^4$ designates a direct bond or the bridge members $CH_2$, $(CH_2)_2$, $C(CH_3)_2$, NHCO or NHCONH.

The new dyestuffs are prepared in a manner which is in itself know, by condensing bis-cyanoacetamides of the formula

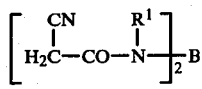   V with aldehydes of the general formula

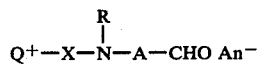   VI or functional derivatives thereof (azomethine, imonium salts etc.),
wherein
$R^1$, B, $Q^+$, R, Z, A and $An^-$ have the meanings explained in the above text.

The condensations are carried out at temperatures between 20° and 140° C., preferably in the range of 50° to 110° C., in an organic solvent. Examples of suitable solvents are alcohols, such as methanol, ethanol, the propanols and butanols, and also benzyl alcohol, ethyl acetate, methyl benzoate, formic acid, acetic acid, acetic anhydride, dimethylformamide, dimethylacetamide, tetramethylurea, acetonitrile, benzonitrile, $C_2$- to $C_4$-glycols and $C_1$- to $C_4$-ethers thereof, and other compounds.

To accelerate the Knoevenagel condensation reaction, basic catalysts can be added, such as, for example, triethylamine, pyridine, piperidine, N-ethylpiperidine, N-methylmorpholine, alkali metal carbonates and alkali metal acetates, and acetates of inorganic or organic nitrogen bases, such as, for example, ammonium acetate or piperidine acetate. Suitable choice of the solvent directly yields stable dyestuff liquid formulations. Suitable bis-cyanoacetamides of the formula V are obtained by means of cyanoacetylation of the corresponding diamines $H_2N$—B—$NH_2$, by reacting these compounds advantageously with methyl cyanoacetate or ethyl cyanoacetate at an elevated temperature (above 100° C.).

Various routes may be considered for the preparation of suitable basic aldehydes VI, such as the reaction of ammonia or the particular primary, secondary or tertiary N bases, hydroxylamine derivatives or hydrazine derivatives or cyclic nitrogen bases with aldehydes of the formula

   VII or with the aromatic bases of the formula

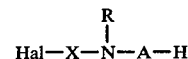   VIII and subsequent formylation according to Vilsmeier and Haack, Hal preferably representing chlorine or bromine.

In some cases, it can also be advatageous, instead of the quaternary aldehydes VI, to employ tertiary aldehydes

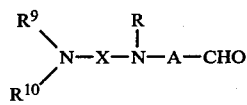   IX or

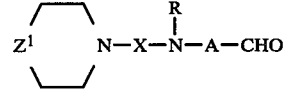   X (with $R^9$, $R^{10}$, X, R, A and $Z^1$ having the meaning given above), which are likewise easily obtained from the corresponding aromatic bases by means of Vilsmeier-Haack formylation, for the condensation with the bis-cyanoacetamides, and to undertake the quaternisation or protonation as the last step of the dyestuff synthesis.

Yet other cases suggest not starting from bis-cyanoacetamides, but joining the bridge B of the dyestuffs as the last synthesis step. This applies, for example, for

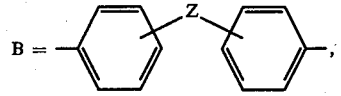

if Z is NHCONH or NHCOCONH.

The aldehydes necessary for the preparation of the dyestuffs according to the invention, or the precursors of these aldehydes, are known from the chemistry of basic methine or azo dyestuffs, or can easily be obtained according to analogous preparation methods. Appropriate data can be taken, for example, from the following literature: German Offenlegungsschriften (German Published Specifications) Nos. 1,619,394, 1,910,465 and 2,011,429, German Auslegeschriften (German Published Specifications) Nos. 1,103,485 and 1,406,841, BE-PS (Belgian Patent Specification) No. 583,002, British Patent Specification No. 1,287,886 and U.S. Pat. No. 3,141,018, 3,424,756 or 3,987,022. Further information may be derived from the following patent examples.

The dyestuffs according to the invention are suitable for dyeing, printing and bulk dyeing of materials which predominantly or completely consist of polyacrylonitrile or its copolymers with other vinyl monomers, such as vinylidene cyanide, vinylidene chloride, vinyl chloride, vinyl acetate, vinyl alcohol, acrylic acid ester or methacrylic acid ester, or of acid-modified polyesters or polyamides. The dyeings and prints obtained, especially or polyacrylonitrile, are distinguished by good general fastness properties, particularly by good light fastness, wet fastness and fastness to perspiration, by a high affinity for the fibre, and by a high pH stability.

Furthermore, the dyestuffs are suitable for the remaining known uses of cationic dyestuffs, such as, for example, the dyeing and printing of cellulose acetate, coconut fibres, jute, sisal, silk, cotton mordanted with tannic acid, and leather, and for the preparation of pastes for ballpoint pens, iter alia by precipitation with anionic dyestuffs, for the preparation of stamping inks and for use in offset printing.

The excellent behaviour of the dyestuffs according to the invention in dyeing sized and unsized papers at the pulp stage is to be particularly emphasised, and particularly high affinities for paper pulps containing lignin (containing wood pulp) as well as for lignin-free paper pulps (for example bleached sulphite cellulose and sulphate cellulose) are found, so that the dyestuffs are outstandingly suitable for the preparation of papers dyed in the form of pulp, without the waste liquors produced being significantly charged with dyestuff.

The dyestuffs predominantly have very good solubilities in water and polar organic solvents, so that they make possible the preparation of stable highly concentrated solutions. They are evenly decolorised by reducing agents, such as hyposulphites or sulphites, so that the recycling or waste papers coloured with these dyestuffs is directly possible.

EXAMPLE 1

18 g of 4,4'-bis-cyanoacetamino-benzanilide and 29 g of [N-ethyl-N-$\beta$-(1-pyridinium)-ethyl]-4-aminobenzaldehyde chloride are heated under reflux for 2 hours in 150 ml of ethanol, with addition of 1 ml of piperidine. The condensation product separates out in crystalline form and, after cooling the reaction mixture to room temperature, is isolated as a yellow powder by filtration under suction, washing with ethanol and drying at 80° C. in a vacuum drying cabinet. The yield is 45 g of dyestuff of the formula:

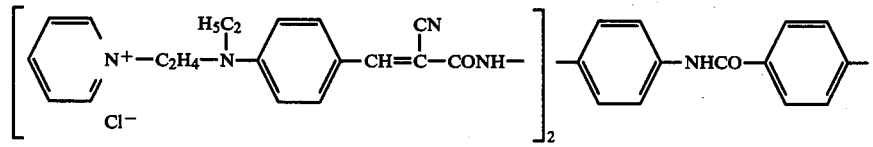

Melting point 216° to 218°.

$\lambda_{max}$=422 nm in 50% strength acetic acid.

The dyestuff dyes polyacrylonitrile and acid-modified polyethylene terephthalate, according to the customary processes, in brilliant, green-tinged yellow shades of good light fastness, with an outstanding general level of fastness. Furthermore, it is suitable for the preparation of stamping inks and pastes for ballpoint pens, as well as for offset printing. In addition, the dyestuff gives brilliant, fast yellow dyeings on coconut fibres, jute, sisal, silk, cotton, leather and keratin-containing substrates.

An outstanding affinity to the fibre and very little colouring of the waste water are observed in the preferred use of the dyestuff for dyeing paper pulps containing wood pulp, and, particularly, lignin-free paper pulps, for example based on bleached sulphite cellulose or sulphate cellulose. The coloured papers show strongly green-tinged yellow shades of high clarity.

The starting materials necessary for the synthesis of the dyestuff are obtained, for example, in the following manner:

(a) 4,4'-bis-cyanoacetamino-benzanilide

A mixture of 461.4 g of 4,4'-diamino-benzanilide, 423 g of methyl cyanoacetate and 860 g of dimethylacetamide is heated to 165°–170° C. for approximately 4 to 5 hours, whilst stirring, until no more methanol distils off and no more diaminobenzanilide can be detected in a thin layer chromatogram (silica gel), and the monocyanoacetyl product is present only in very small quantity. Thereupon, the bulk of the solvent is removed by distillation under reduced pressure, 1.5 l of methanol are added to the residue, and the mixture is stirred for 15 minutes at room temperature. By filtering off under suction, washing with methanol and drying at 80° C. in vacuo, approximately 580 g of 4,4'-bis-cyanoacetamino-benzanilide of melting point 320° C. are obtained, the identity of which is confirmed by the mass spectrum (calculated molar weight: 361; found m/e=361 and corresponding fragmentation).

The remaining bis-cyanoacetamides included in the examples were prepared and characterised in the same manner. In some of these processes, a particular solvent was not employed and, instead, methyl cyanoacetate or ethyl cyanoacetate was employed in excess and this material was recovered from the mother liquor by distillation, in a purity suitable for re-use.

(b) [N-ethyl-N-$\beta$-(1-pyridinium)-ethyl]-4-aminobenzaldehyde chloride 95.2 g of N-ethyl-N-$\beta$-chloroethyl-4-aminobenzaldehyde are heated under reflux for approximately 17 hours (internal temperature approximately 120° C.) in 300 ml of dry pyridine, until the thin layer chromatogram indicates complete conversion to the quaternary aldehyde. The reaction product which has crystallised out is filtered off under suction at 0° C., washed with toluene, and dried at 80° C. in vacuo. The yield of crude quaternary aldehyde is almost quantitative, and its melting point is 149° to 151° C.

(c) The same aldehyde may also be obtained by formylation of the quaternary base, according to Vilsmeier and Haack, as follows:

39.4 g of N-ethyl-N-$\beta$-(1-pyridinium)-ethylaniline chloride are warmed to 70°–75° C. in 50 ml of dimethylformamide, and 25.3 g of phosphorus oxychloride are added dropwise to the mixture at this temperature in the course of 1 hour, whilst stirring. The reaction is complete after the mixture has been stirred for a further 4 hours at 75° C. 100 ml of ethanol and approximately 30 ml of 45% strength sodium hydroxide solution are now successively added dropwise to the mixture until pH 9 is reached, the mixture is further stirred for 1 hour, and the inorganic salts which have separated out are removed by filtration of the reaction mixture under suction. The salts are washed with ethanol, and the combined filtrates are freed of solvent under reduced pressure. 250 ml of dry isopropanol are added to the oily residue, the mixture is stirred for some time at 50° C., and a small amount of inorganic salts is again filtered off under suction. This is washed with 50 ml of dry methanol, and the quaternary aldehyde is obtained from the filtrates, by distilling off the solvent under reduced pressure, as a viscous oil (42.6 g) which crystallises out, and which requires no further purification operations for the intended reactions.

The majority of the quaternary and tertiary aldehydes used in the examples were obtained according to the procedures described under (b) and (c), and in themselves known, by appropriate variation of the starting compounds. The remainder either had been described as such or were accessible according to analogous methods.

EXAMPLE 2

54 g of 4,4'-bis-cyanoacetamino-benzanilide and 66 g of N-ethyl-N-β-dimethylaminoethyl-4-amino-benzaldehyde are heated under reflux for approximately 10 hours in 1 l of dry methanol, after addition of 5 ml of piperidine, whilst stirring, until the aldehyde has completely reacted. The dyestuff precursor which separated out is isolated by filtering off at room temperature, washing with methanol and drying at 70° C. in vacuo. The yield is 109 g of precursor of the formula

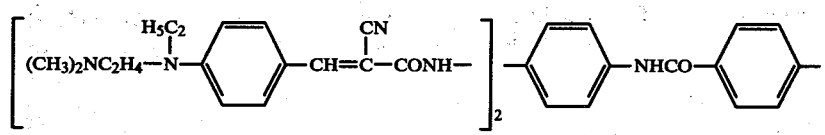

of melting point 228° to 230° C.; $\lambda_{max}=424$ nm in 50% strength acetic acid.

To convert the product, which is insoluble in water, into a bis-cationic dyestuff according to the invention, 30 g of the product are introduced into 70 g of a mixture of 80 parts of lactic acid and 20 parts of acetic acid, and the mixture is stirred, whilst warming to 60° to 80° C., until a clear solution is formed. The resulting liquid formulation contains the dyestuff of the formula:

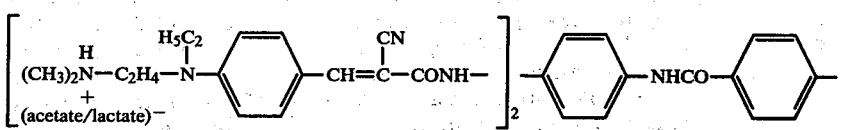

which, in contrast to the precursor, is easily watersoluble and outstandingly suitable for dyeing, particularly of paper materials in the form of pulp. In this process, brilliant green-tinged yellow coloured papers result, whilst the waste liquors, even in the case of lignin-free paper pulps, are not significantly coloured.

If the aldehydes and/or bis-cyanoacetamides in Examples 1 and 2 are replaced by other claimed starting compounds, further dyestuffs according to the invention are obtained, which are distinguished by good dyeing properties for cationically colorable substrates, especially by outstanding affinity to lignin-containing paper pulps, but also especially to lignin-free paper pulps.

A selection is listed in the following tables, with the shades which papers based on bleached sulphite cellulose and dyed at the pulp stage assume by means of these dyestuffs.

TABLE 1

$$\left[ Q^+ \underset{\underset{R}{|}}{-}X-N \underset{\underset{R''}{|}}{\overset{\overset{R'}{|}}{\diagdown}} CH=C-CONH-B \right]_2 2An^-$$

| Example No. | Q | X | R | R' | R'' | —B— | Shade of bulk-dyed, bleached sulphite cellulose |
|---|---|---|---|---|---|---|---|
| 3 | (CH₃)₂HN— | (CH₂)₃ | C₂H₅ | H | H | —NHCO—C₆H₄—C₆H₄—CH₃ (p-tolyl-NHCO-phenyl) | strongly green-tinged yellow |
| 4 | " | " | C₆H₅(CH₂)₂ | " | CH₃ | " | " |
| 5 | " | C₂H₄OC₂H₄ | C₂H₅ | " | " | " | " |
| 6 | (CH₃)₃N— | C₂H₄ | C₂H₅ | " | H | " | " |
| 7 | " | " | " | " | CH₃ | " | " |
| 8 | HOC₂H₄N(CH₃)₂— | " | " | " | H | " | " |
| 9 | HOC₂H₄N(C₂H₅)₂— | " | " | " | " | " | " |
| 10 | piperidine-NH— | " | CH₃ | " | " | " | " |
| 11 | morpholine-N(CH₃)— | " | C₂H₅ | " | " | " | " |
| 12 | H₃C—N(imidazole)— | " | " | " | " | " | " |
| 13 | (CH₃)₂NH— | " | " | " | " | —NHCO—(3-methylphenyl)—(3-methylphenyl) | " |
| 14 | (CH₃)₂NC₂H₅— | " | " | " | " | " | " |

TABLE 1-continued $$\left[ Q^+ - X - N \begin{array}{c} R \\ | \\ \end{array} \underset{R''}{\overset{R'}{\bigcirc}} - CH = C - CONH \right]_2 - B \quad 2\ An^-$$

| Example No. | Q | X | R | R' | R'' | —B— | Shade of bulk-dyed, bleached sulphite cellulose |
|---|---|---|---|---|---|---|---|
| 15 | (CH₃)₂NH— | " | " | " | CH₃ | —⌬—NHCONH—⌬— | " |
| 16 | pyridinium | " | " | " | H | —⌬—O—⌬— | " |
| 17 | " | " | " | " | " | —⌬—S—⌬— | " |
| 18 | " | " | " | " | " | —⌬—N(CH₃)—⌬— | " |
| 19 | " | " | " | " | " | —⌬—CH₂—⌬— | " |
| 20 | " | " | " | " | " | —⌬—CH₂CH₂—⌬— | " |

TABLE 1-continued $$\left[ Q^+ \begin{array}{c} R' \\ | \\ \text{---} X \text{---} N \text{---} \\ | \\ R \end{array} \begin{array}{c} \\ \\ \\ R'' \end{array} \text{---} CH = C \text{---} CONH \text{---} B \right]_2 2 An^-$$

| Example No. | Q | X | R | R' | R'' | —B— | Shade of bulk-dyed, bleached sulphite cellulose |
|---|---|---|---|---|---|---|---|
| 21 | " | " | " | " | " | –C₆H₄–C(CH₃)₂–C₆H₄– | " |
| 22 | " | " | " | " | " | –(4-CH₃-C₆H₄)–N=N–(4-CH₃-C₆H₄)– | clear yellow |
| 23 | " | " | " | " | " | 4-tolyl-benzotriazole | strongly green-tinged yellow |
| 24 | " | " | " | " | " | 4-tolyl-benzimidazole | " |
| 25 | " | " | " | " | " | phenyl-benzoxazole | " |
| 26 | " | " | " | " | " | –(4-CH₃-C₆H₄)–CONHNHCO–(4-CH₃-C₆H₄)– | " |

TABLE 1-continued
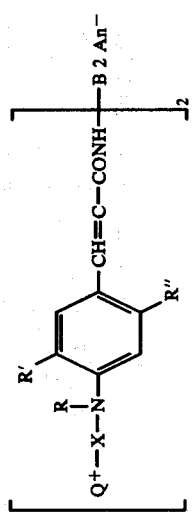
| Example No. | Q | X | R | R' | R'' | —B— | Shade of bulk-dyed, bleached sulphite cellulose |
|---|---|---|---|---|---|---|---|
| 27 | (CH₃)₂NH— | " | " | " | " | 4-CH₃-C₆H₄-C(=N-N=C(O-)-C₆H₄-4-CH₃ | " |
| 28 | " | " | " | " | " | 4-CH₃-C₆H₄-NHCOCONH-C₆H₄-4-CH₃ | " |
| 29 | " | " | " | " | " | 4-CH₃-C₆H₄-NHCO(CH₂)₄CONH-C₆H₄-4-CH₃ | " |
| 30 | " | " | " | " | " | 4-CH₃-C₆H₄-NHCO-C₆H₄-CONH-C₆H₄-4-CH₃ | " |
| 31 | " | " | " | " | " | 4-CH₃-C₆H₄-O-C₆H₄-4-CH₃ | " |
| 32 | " | " | " | " | " | 4-CH₃-C₆H₄-CH₂-C₆H₄-4-CH₃ | " |

TABLE 1-continued $$\left[ Q^+ - X - N\genfrac{}{}{0pt}{}{R}{\phantom{}} - \underset{R'}{\overset{R''}{\bigcirc}} - CH=C-CONH \right]_2 B\ 2\ An^-$$

| Example No. | Q | X | R | R' | R'' | —B— | Shade of bulk-dyed, bleached sulphite cellulose |
|---|---|---|---|---|---|---|---|
| 33 | " | " | " | " | " | ⌬—⌬ | " |
| 34 | " | " | " | " | CH₃ | ⌬—CH₂CH₂—⌬ | " |
| 35 | " | " | " | " | " | ⌬—C(CH₃)₂—⌬ | clear yellow |
| 36 | " | " | " | " | H | ⌬—N=N—⌬ | green-tinged yellow |
| 37 | " | " | " | " | " | benzotriazole-diyl with tolyl | strongly green-tinged yellow |
| 38 | (HOC₂H₄)₃N— | " | " | " | " | benzothiazole-diyl with tolyl | green-tinged yellow |
|    |   |   |   |   |   | naphthalene-1,5-diyl |   |

TABLE 1-continued
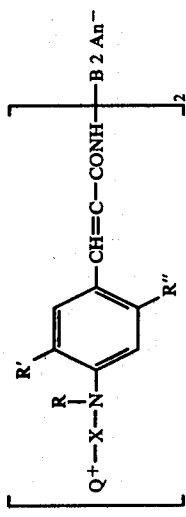
| Example No. | Q | X | R | R' | R" | —B— | Shade of bulk-dyed, bleached sulphite cellulose |
|---|---|---|---|---|---|---|---|
| 39 | (CH$_3$)$_2$NH— | " | " | " | " | | " |
| 40 | " | " | " | " | " | 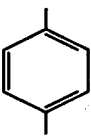 | strongly green-tinged yellow |
| 41 | " | " | " | " | " | 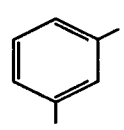 | " |
| 42 | " | " | " | " | " | 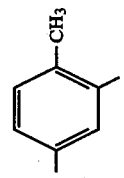 | " |
| 43 | " | " | " | " | CH$_3$ | 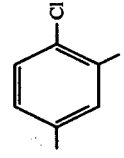 | " |
| 44 | " | " | C$_4$H$_9$ | " | H | 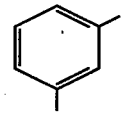 | " |
| | | | | | | 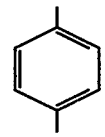 | |

TABLE 1-continued $$\left[ Q^+ -X-\underset{R}{N}- \underset{R'}{\underset{|}{\bigcirc}} -CH=C-CONH-B \right]_2 2An^-$$

| Example No. | Q | X | R | R' | R'' | —B— | Shade of bulk-dyed, bleached sulphite cellulose |
|---|---|---|---|---|---|---|---|
| 45 | (CH₃)₃N— | " | C₂H₅ | " | CH₃ | " | " |
| 46 | H₂N—N(CH₃)₂— | " | " | " | H | " | " |
| 47 | CH₃ON(CH₃)₂— | " | " | " | " | " | " |
| 48 | (C₂H₅)₂NH— | " | " | " | CH₃ | " | " |
| 49 | CH₃OC₂H₄N(CH₃)₂— | " | " | " | " | " | " |
| 50 | C₄H₉N(CH₃)₂— | " | " | " | " | " | " |
| 51 | HOC₂H₄N(CH₃)₂— | " | " | " | " | " | " |
| 52 | H₂N(CH₂)₃N(CH₃)₂— | " | " | " | " | " | " |
| 53 | OHC—NH(CH₂)₃N(CH₃)₂— | " | " | " | " | " | " |
| 54 | ![cyclohexyl-N(CH₃)₂]— | " | " | " | H | " | " |
| 55 | ![benzyl-CH₂N(CH₃)₂]— | " | " | " | " | " | " |
| 56 | (CH₃)₂NH— | (CH₂)₃ | C₆H₅CH₂CH₂ | " | CH₃ | " | " |
| 57 | " | " | " | " | " | " | " |
| 58 | ![N-methylpiperidinyl] | C₂H₄ | C₂H₅ | " | " | " | " |
| 59 | (C₂H₅)₃N— | " | CH₃ | " | OCH₃ | " | " |
| 60 | (CH₃)₂NH— | " | C₂H₅ | " | CH₃ | 4,4'-biphenylene | green-tinged yellow |

TABLE 1-continued $$\left[Q^+ - X - N\begin{array}{c}R\\|\\\end{array}\overset{R'}{\underset{R''}{\bigcirc}} CH=C-CONH\right]_2 B\ 2\ An^-$$

| Example No. | Q | X | R | R' | R'' | —B— | Shade of bulk-dyed, bleached sulphite cellulose |
|---|---|---|---|---|---|---|---|
| 61 | " | " | " | " | H | ![3,3'-dimethyl-4,4'-biphenylene] | " |
| 62 | " | " | " | " | " | " | " |
| 63 | " | " | " | " | " | ![3,3'-dichloro-4,4'-biphenylene] | " |
| 64 | " | " | " | " | CH₃ | " | " |
| 65 | " | " | " | " | H | ![3,3'-dimethoxy-4,4'-biphenylene] | " |
| 66 | ![pyridinium] | " | " | " | CH₃ | " | " |
| 67 | C₆H₅OC₂H₄N(CH₃)₂— | " | " | " | H | ![p-phenylene] | strongly green-tinged yellow |

TABLE 1-continued $$\left[Q^+-X-\underset{R}{N}-\underset{R'}{\overset{R''}{\bigotimes}}-CH=C-CONH-B\right]_2 2 An^-$$

| Example No. | Q | X | R | R' | R'' | —B— | Shade of bulk-dyed, bleached sulphite cellulose |
|---|---|---|---|---|---|---|---|
| 68 | pyridinyl | CH₂CH(CH₃) | " | " | CH₃ | | " |
| 69 | " | CH₂CH(C₆H₅) | " | " | H | | " |
| 70 | " | C₂H₄ | C₆H₅CH₂ | " | " | 2,4-dimethylphenyl | " |
| 71 | " | " | C₆H₅OC₂H₄ | " | " | | " |
| 72 | " | " | " | " | CH₃ | | " |
| 73 | " | " | NC—C₂H₄ | " | " | 3-(4-methylbenzamido)-5-(4-methylphenylcarbamoyl)phenyl | " |
| 74 | " | " | Q—X | " | " | 1,5-naphthyl | green-tinged yellow |

TABLE 1-continued
$$\left[ Q^+-X-N\underset{R}{\underset{|}{\overset{R'}{\bigodot}}}\underset{R''}{\overset{CH=C-CONH}{\longleftarrow}}B\right]_2 2 An^-$$
| Example No. | Q | X | R | R' | R'' | —B— | Shade of bulk-dyed, bleached sulphite cellulose |
|---|---|---|---|---|---|---|---|
| 75 | " | " | " | " | " | 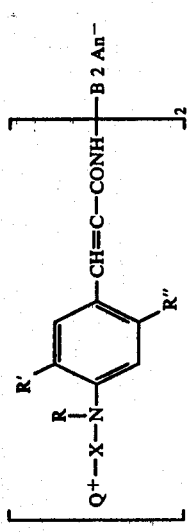 | strongly green-tinged yellow |
| 76 | (CH₃COOC₂H₄)₃N— | " | C₂H₅ | " | " |  | " |
| 77 | 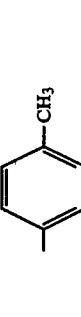 | " | H | CH₃O | CH₃O |  | " |
| 78 | H₂NC₂H₄NH₂— | " | C₂H₅ | H | CH₃ | " | " |
| 79 | HOC₂H₄OC₂H₄N(CH₃)₂— | " | " | " | " |  | " |
| 80 | 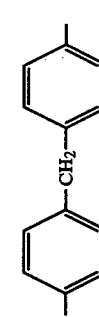 | " | CH₃ | " | Cl | " | " |

EXAMPLE 81

25.6 g of N,N'-bis-cyanoacetyl-2,4-diaminotoluene and 68.9 g of N-β-(1-pyridinium)-ethyl-2,2,4-trimethyl-6-formyl-1,2,3,4-tetrahydroquinoline chloride are heated for approximately 4 hours to 60°-70° C., whilst stirring, in 100 g of propylene glycol, with addition of 5 g of piperidine. 200 g of a clear deep yellow solution of the dyestuff of the formula in propylene glycol ($\lambda_{max}$=422 nm in 50% strength acetic acid) are obtained, from which, by addition of 50 g of water, a low viscosity, stable and approximately 36% strength liquid formulation is prepared. The dyestuff can be diluted to any desired extent with water, and dyes bleached sulphite cellulose, in the form of pulp, with outstanding affinity in a clear yellow shade, only traces of the dyestuff being imparted to the waste liquor.

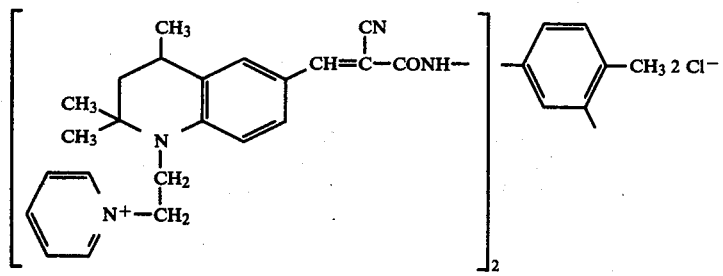

The dyestuffs listed in Table 2 exhibit similar properties:

TABLE 2

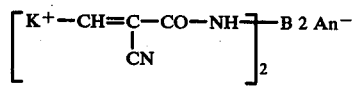

| Example No. | K | —B— | Shade of bulk-dyed, bleached sulphite cellulose |
|---|---|---|---|
| 82 | (CH₃)₂N⁺-piperazine-phenyl- | -phenyl-NHCO-phenyl- | strongly green-tinged yellow |
| 83 | piperidinium-piperazine-phenyl- | -phenyl-CH₂-phenyl- | " |
| 84 | (CH₃)₂N⁺H—C₂H₄—N(with branched alkyl substituent)-phenyl- | -phenyl- | clear yellow |
| 85 | (CH₃)₂N⁺H—C₂H₄—N-naphthyl- | " | " |
| 86 | pyridinium-N⁺—C₂H₄—N(with branched alkyl-O substituent)-phenyl- | " | " |

TABLE 2-continued $$\left[ K^+ - CH = \underset{CN}{C} - CO - NH - \right]_2 B \; 2'An^-$$

| Example No. | K | —B— | Shade of bulk-dyed, bleached sulphite cellulose |
|---|---|---|---|
| 87 | $(CH_3)_2\overset{+}{N}H(CH_2)_3-N$  | 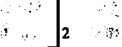 | green-tinged yellow |

EXAMPLE 88

The quantity of polyacrylonitrile fibres corresponding to the liquor ratio 1:40 is introduced at 40° C. into an aqueous dyebath, which contains, per 1,000 ml, 0.75 g of 30% strength acetic acid, 0.38 g of sodium acetate and 0.15 g of the dyestuff described in Example 1, the bath is heated to boiling in the course of 20 to 30 minutes, and the fibres are dyed for 30 to 60 minutes at the boil. The subsequently rinsed and dried dyed goods have a brilliant, green-tinged yellow coloration, which is distinguished, in general, by good fastness properties, particularly by good fastness to light, washing and decatising.

If wet-spun polyacrylonitrile fibres in the gel state are dyed with the same dyestuff under the conditions of the so-called NEOCHROM process, dyeings having a comparable level of fastness properties are likewise obtained.

EXAMPLE 89

A stock solution, prepared from 15 g of the dyestuff according to Example 41, 15 g of polyacrylonitrile and 70 g of dimethylformamide, is added in the desired quantity to a customary spinning solution of polyacrylonitrile, and the coloured solution is spun in a known manner. Polyacrylonitrile filaments with a green-tinged yellow coloration result, which have outstanding fastness properties, particularly very good fastness to light, washing and decatising.

EXAMPLE 90

A fabric of polyacrylonitrile is printed with a printing paste of the following composition: 30 g of the dyestuff described in Example 6, 30 g of thiodiethylene glycol, 30 g of cyclohexanol, 30 g of 30% strength acetic acid, 500 g of starch gum, 30 g of aqueous zinc nitrate solution (d=1.5 gcm$^{-3}$) and 330 g of water.

The brilliant, green-tinged yellow print obtained is dried, steamed for 30 minutes, and then rinsed. It is distinguished by good fastness properties.

EXAMPLE 91

Acid-modified polyglycol terephthalate fibres, as described in Belgian Patent Specification No. 549,179 and in U.S. Pat. No. 2,893,816, are introduced, at 20° C. and with a liquor ratio of 1:40, into a dyebath which contains, per 1,000 ml, 3 to 10 g of sodium sulphate, 0.1 to 2 g of oleyl polyglycol ether (containing 50 mols of ethylene oxide), 0 to 15 g of dimethylbenzyldodecylammonium chloride and 0.3 g of dyestuff according to Example 67, and which has been adjusted to a pH value of 4.5 to 5.5 with acetic acid or sodium acetate. The bath is heated to 98° C. in the course of 30 minutes, and is kept at this temperature for 60 minutes. After the fibres have been subsequently rinsed and dried, they exhibit a brilliant, green-tinged yellow dyeing with good fastness properties.

EXAMPLE 92

0.2 g of the dyestuff solution according to Example 81, after addition of 0.5 g of oleyl polyglycol ether (containing 50 mols of ethylene oxide), is made up with water to 500 ml in a dye beaker of 500 ml capacity, situated in a heated waterbath, and the pH value of the dye liquor is adjusted to 4.5–5. 10 g of piece goods of acid-modified polyamide are continuously agitated in this liquor, whilst the bath temperature is raised to 100° C. in the course of 15 minutes. After the goods have been dyed for 15 to 20 minutes at the boil, the dyed goods are rinsed and dried, for example by ironing or at 60° to 70° C. in a drying cabinet. A clear, green-tinged yellow dyeing with good fastness properties is obtained.

EXAMPLE 93

In a Hollander, dye stuff, consisting of 60% of wood pulp and 40% of unbleached sulphite cellulose, is mixed with sufficient water, and is beaten to a freeness of 40° SR, so that the solids content is somewhat above 2.5%; the material is then adjusted with water to exactly 2.5% solids content of the high density pulp. 5 g of a 0.25% strength aqueous solution of the dyestuff according to Example 39 are added to 200 g of this high density pulp, the mixture is stirred for approximately 5 minutes, 2% of resin size and 4% of alum, relative to solids, are added to the mixture, and the latter is again stirred for a few minutes, until it is homogeneous. The pulp is diluted to 700 ml with approximately 500 g of water, and paper sheets are prepared from this pulp, in a known manner, by sucking off on a paper-forming apparatus. The paper sheets exhibit an intense, green-tinged yellow coloration. The quantity of the dyestuff which is not bound to the paper is determined photometrically (at $\lambda_{max}$=430 nm) in the waste liquor of the sheet-forming apparatus as approximately 2%. On dyeing unsized paper pulps, in an otherwise identical procedure, approximately 3% of non-fixed dyestuff is found.

Virtually all dyestuffs according to the invention show similarly slight waste water colorations under the above working conditions.

Example 94

5 g of a 0.5% strength aqueous solution of the approximately 36% strength dyestuff solution ($\lambda_{max}$=422 nm) prepared in Example 81 are added to 200 g of a 2.5% strength high density pulp (freeness 35° SR), prepared analogously to Example 93, but exclusively using bleached sulphite cellulose, and the pulp is processed to paper, without addition of resin size and alum. A sheet-paper is obtained which is dyed in a strong, clear yellow shade. The waste water contains, according to photometric determination, only approximately 3% of the dyestuff employed. If the dyeing of the paper pulp is effected in the presence of 2% of resin size and 4% of alum (see Example 93), a similar result is obtained, and only approximately 2% of the dyestuff remains in the water liquor.

EXAMPLE 95

10 g of the paper dyed according to Example 93 are warmed to 60° C. for 1 hour in 200 g of water, with addition of 0.2 g of sodium sulphite and 0.1 g of sodium bisulphite. The paper pulp is completely decolorised; it can again be fed to a dyeing and paper preparation process (recycling).

The same result is obtained on using 2% of sodium hyposulphite as reducing agent (60°/30 minutes), or on using the dyed sulphite cellulose of Example 94.

EXAMPLE 96

51 g of 1,4-bis-cyanoacetamino-benzene are added to a solution of 94 g of N-ethyl-N-β-dimethylaminoethyl-2-methyl-4-aminobenzaldehyde in 100 g of acetic acid, and the reaction mixture is heated to 60°-65° C. for 3 to 4 hours, whilst stirring, until the starting materials have virtually completely reacted (thin layer chromatography on silica gel; running agent chloroform/methanol 9:1 v/v). 100 g of water are then added to the mixture, and 345 g of a low-viscosity, approximately 45% strength liquid formulation of the dyestuff of the formula

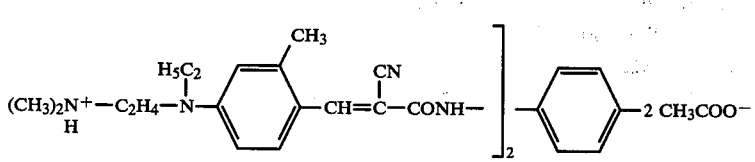

is obtained, which is stable on storage. $\lambda_{max}$=439 to 440 nm in 50% strength acetic acid.

The dyestuff solution can be diluted without limit with water, and is outstandingly suitable for dyeing paper materials, particularly bleached sulphite and sulphate cellulose, in the form of pulp, intensive, clear green-tinged yellow shades being obtained, and the waste liquors being virtually colourless.

I claim:

1. A cationic styryl dyestuff of the formula

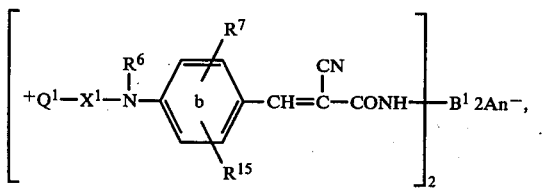

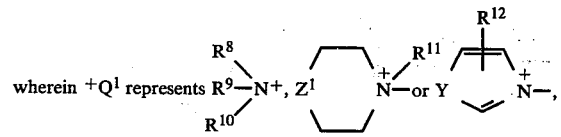

and wherein $R^8$, $R^9$, $R^{10}$ and $R^{11}$, independently of one another, represent hydrogen or $C_1$- to $C_4$-alkyl, which can be substituted by hydroxyl, amino, formylamino, $C_1$- to $C_4$-alkoxy, hydroxy-$C_2$- to $C_4$-alkoxy, phenyl, phenyloxy, $C_1$- to $C_3$-alkylcarbonyloxy, fluorine, chlorine or bromine, and $R^8$ additionally represents $C_1$- to $C_4$-alkoxy, amino, formylamino, phenyl, cyclopentyl or cyclohexyl, $Z^1$ represents a direct bond, $CH_2$, $C_2H_4$, O, S, NH or N—$C_1$- to $C_2$-alkyl, $R^{12}$ represents 1 to 3 radicals from the series comprising hydrogen, $C_1$- to $C_4$-alkyl, fluorine, chlorine or bromine, Y represents O, S, NH, N—$C_1$- to $C_2$-alkyl or CH=CH, $X^1$ represents $C_2$- to $C_3$-alkylene, which is optionally branched and/or substituted by hydroxyl, $C_1$- to $C_4$-alkoxy or phenyl, and $R^6$ represents $C_1$- to $C_4$-alkyl, which is optionally substituted by chlorine, cyano, $C_1$- to $C_4$-alkyloxy, phenyl or phenyloxy or $R^6$ represents phenyl or the radical —$X$—$Q^{+1}An^-$, or $R^6$ with —$X$—$Q^{+1}$ and the N atom, to which both are bonded, together form a piperazinium system of the structure

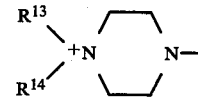

$R^{13}$ represents hydrogen or $C_1$- to $C_4$-alkyl, which can be substituted by $C_1$- to $C_4$-alkyloxy, hydroxyl, $C_1$- to $C_3$-alkylcarbonyloxy or phenyl, $R^{14}$ represents $C_1$- to $C_4$-alkyl, or $R^{13}$ and $R^{14}$ together represent $(CH_2)_4$ or $(CH_2)_5$, or $R^6$ and $R^7$, together with the benzene ring and the nitrogen atom to which $R^6$ is bonded, are constituents of an indoline, 1,2,3,4-tetrahydroquinoline or 2,3-dihydro-1,4-benzoxazine ring system, which is optionally substituted in the heterocyclic ring by 1 to 4 $C_1$- to $C_4$-alkyl groups or by a phenyl radical, or $R^7$ and $R^{15}$, independently of one another, denote hydrogen, $C_1$- to $C_2$-alkyl, $C_1$- to $C_2$-alkyloxy, bromine or chlorine, and $B^1$ represents

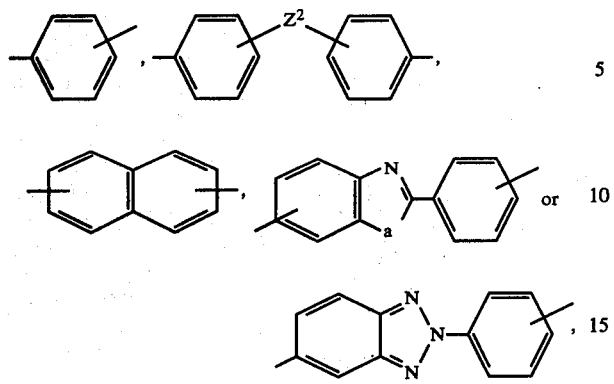

wherein

Z² designates a direct bond or a connecting member from the series O, S,

(CH₂)₂, CH=CH, CH₂O, CH₂OCH₂, NR¹⁶, N=N, NR¹⁶CO, NR¹⁶CONR¹⁶, NR¹⁶CO(CH₂-)₁₋₄CONR¹⁶, CONR¹⁶CO, NR¹⁶SO₂,

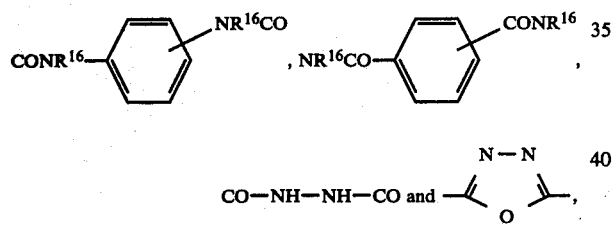

CO—NH—NH—CO and and

R¹⁶ and R¹⁶ᵃ, independently of one another, represent C₁- to C₂-alkyl and, particularly, hydrogen, and in the case of

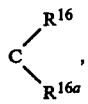

also together represent (CH₂)₄ or (CH₂)₅, a represents O, S or NR¹⁶ and

An⁻ represents an anion, wherein phenylene nuclei are present as 1,3- or 1,4-phenylene, and the phenyl radicals and phenylene, naphthylene and fused benzoid nuclei mentioned can additionally be substituted by 1 to 3 C₁- to C₄-alkyl groups, C₁- to C₄-alkyloxy groups, C₁- to C₄-alkyloxycarbonyl groups, cyano groups or CF₃ groups and/or Br or Cl.

2. A cationic styryl dyestuff of the formula

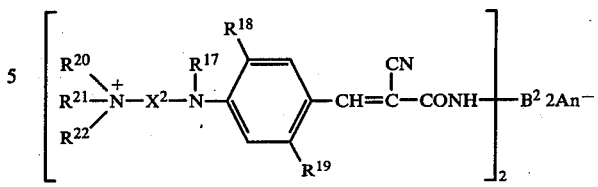

wherein

An⁻ has the meaning mentioned in claim 1,

R²⁰, R²¹ and R²², independently of one another, represent hydrogen or C₁- to C₄-alkyl, which can be substituted by hydroxyl, amino, formylamino, C₁- to C₄-alkoxy, hydroxy-C₂- to C₄-alkoxy, phenyl, phenoxy, C₁- to C₃-alkylcarbonyloxy or chlorine, and R²⁰ additionally represents phenyl or cyclohexyl, or R²⁰, R²¹ and R²² together with the quaternary nitrogen represent pyridinium which is optionally substituted by methyl or ethyl, X² represents optionally branched C₂- to C₃-alkylene, R¹⁷ represents C₁- to C₄-alkyl, which is optionally substituted by cyano, C₁- to C₄-alkyloxy, phenyl or phenyloxy, R¹⁸ and R¹⁹, independently of one another, represent hydrogen, C₁- to C₂-alkyl, C₁- to C₂-alkyloxy or chlorine, or R¹⁷ and R¹⁸ together represent the ring members necessary for the formation of a dihydroinidole, 1,2,3,4-tetrahydroquinoline or 2,3-dihydrobenz[b]-1,4-oxazine system, particularly the members CH₂CH(CH₃)  C(CH₃)₂CH(CH₃), CH₂CH₂CH(CH₃), CH(CH₃)CH₂C(CH₃)₂, OCH₂CH₂, OCH₂CH(CH₃), OCH₂CH(C₆H₅) or OC(CH₃)₂CH(CH₃), and B² denotes

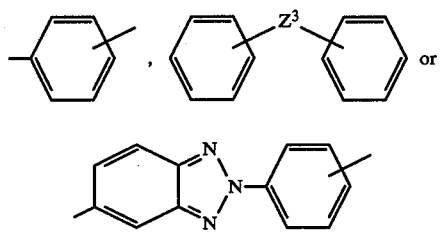

wherein the phenylene radicals are 1,3- or 1,4-linked and can carry, in addition, 1 to 2 radicals from the series comprising CH₃, C₂H₅, CH₃O, C₂H₅O or Cl, and Z³ designates a direct bond or the bridge members (CH₂)₂, CH=CH,

(with R²³ and R²⁴, independently of one another, identical with H, CH₃ or C₂H₅ or, together, (CH₂)₅), NR²⁵ (with R²⁵ equal to H, CH₃ or C₂H₅), NHCO, NHCONH, CONHCO or

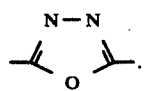

3. A cationic styryl dyestuff of the formula

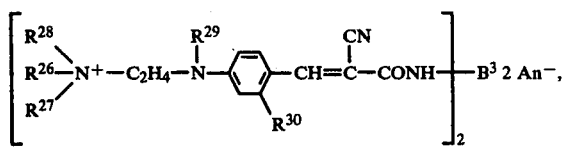

wherein
An⁻ has the meaning mentioned in claim 1, and
$R^{26}$, $R^{27}$ and $R^{28}$, independently of one another, are identical with H, methyl, ethyl, propyl, butyl, hydroxyethyl, hydroxypropyl, formylaminoethyl, formylaminopropyl, aminoethyl or aminopropyl, or $R^{26}$, $R^{27}$ and $R^{28}$ together with the quaternary nitrogen represent pyridinium, which is optionally substituted by methyl or ethyl,
$R^{29}$ denotes methyl, ethyl, methoxyethyl, ethoxyethyl, cyanoethyl, phenyl, benzyl, α- or β-phenylethyl, phenyloxyethyl or phenyloxypropyl,
$R^{30}$ denotes hydrogen or methyl, and
$B^3$ denotes 1,3- or 1,4-phenylene, or a radical of the formula

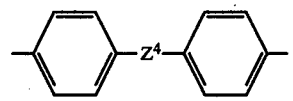

wherein
the phenylene radicals can be substituted by 1 to 2 methyl, chlorine or methoxy, and
$Z^4$ designates a direct bond or the bridge members $CH_2$, $(CH_2)_2$, $C(CH_3)_2$, NHCO or NHCONH.

4. A cationic styryl dyestuff according to claim 1 of the formula

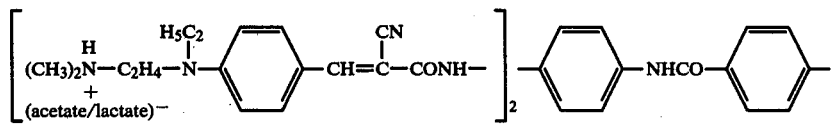

* * * * *

UNITED STATES PATENT AND TRADEMARK OFFICE
CERTIFICATE OF CORRECTION

PATENT NO. : 4,422,969
DATED : December 27, 1983
INVENTOR(S) : Hermann Beecken

It is certified that error appears in the above-identified patent and that said Letters Patent is hereby corrected as shown below:

| | |
|---|---|
| Abstract, 4th line from bottom | Delete "anc" and insert --and-- |
| Col. 7, line 15 | Delete "know" and insert --known-- |
| Col. 7, line 32 | After "R," delete "Z" and insert --X-- |
| Col. 8, line 65 | Delete "or" and insert --on-- |
| Col. 9, line 6 | Delete "iter" and insert --inter-- |
| Col. 9, line 24 | Delete "or" and insert --of-- |
| Cols. 13, 15, 17, 19, 21, 23, 25, 27, 29 and 31 | Delete formula as printed in heading and insert |

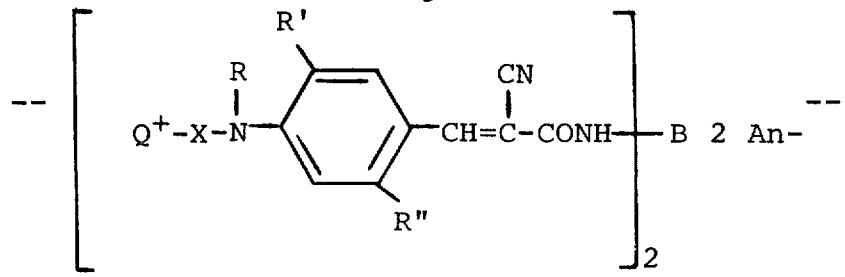

UNITED STATES PATENT AND TRADEMARK OFFICE
CERTIFICATE OF CORRECTION

PATENT NO. : 4,422,969
DATED : December 27, 1983
INVENTOR(S) : Hermann Beecken

It is certified that error appears in the above-identified patent and that said Letters Patent is hereby corrected as shown below:

Col. 15, Ex. 16, under "-B-"  Delete second structure "  "

and insert --  --

Col. 29, Ex. 72, under "R"  Delete "$C_6$" and insert --$C_2$--

Col. 37, line 11  Delete "water" and insert --waste--

Signed and Sealed this

Second Day of October 1984

[SEAL]

Attest:

GERALD J. MOSSINGHOFF

Attesting Officer    Commissioner of Patents and Trademarks